(12) United States Patent
Knop

(10) Patent No.: US 12,480,564 B2
(45) Date of Patent: Nov. 25, 2025

(54) BALL SCREW DRIVE, METHOD FOR PRODUCING A BALL SCREW DRIVE AND ACTUATOR ASSEMBLY HAVING A BALL SCREW DRIVE

(71) Applicant: ZF Active Safety GmbH, Koblenz (DE)

(72) Inventor: Volker Knop, Ulmen (DE)

(73) Assignee: ZF Active Safety GmbH, Koblenz (DE)

( * ) Notice: Subject to any disclaimer, the term of this patent is extended or adjusted under 35 U.S.C. 154(b) by 7 days.

(21) Appl. No.: 18/535,084

(22) Filed: Dec. 11, 2023

(65) Prior Publication Data

US 2024/0209928 A1    Jun. 27, 2024

(30) Foreign Application Priority Data

Dec. 21, 2022    (DE) .......................... 102022134386.3

(51) Int. Cl.
*F16H 25/00* (2006.01)
*F16D 65/18* (2006.01)
(Continued)

(52) U.S. Cl.
CPC ......... *F16H 25/2228* (2013.01); *F16D 65/18* (2013.01); *F16H 25/2223* (2013.01); *F16D 2125/40* (2013.01); *F16H 2025/2242* (2013.01)

(58) Field of Classification Search
CPC ............. F16H 25/2228; F16H 25/2223; F16H 2025/2242; F16H 25/2214; F16D 65/18; F16D 2125/40
See application file for complete search history.

(56) References Cited

U.S. PATENT DOCUMENTS 3,512,426 A  *  5/1970  Dabringhaus ....... F16H 25/2214
                                                74/424.87
5,899,114 A  *  5/1999  Dolata ................ F16H 25/2228
                                                74/424.85

(Continued)

*Primary Examiner* — Victor L Macarthur
(74) *Attorney, Agent, or Firm* — Kristin L. Murphy

(57) ABSTRACT

An actuator assembly comprises a ball screw drive having a ball screw spindle rotatably mounted about a spindle axis, on which a spindle nut is received, and a thread track on an outer circumferential surface of the ball screw spindle, has a portion of a ball return on a circumferential wall of the ball screw spindle, which return connects a beginning and an end of the thread track to one another. At the beginning and at the end of the thread track, an insert is inserted in which a ball race is formed, which is part of the ball return. The inserts are arranged such that each end of a ball race adjoins a portion of the ball return and another end adjoins a beginning of a thread track or an end of the thread track. In a section perpendicular to a spindle axis, an angle of the ball race to a tangent to the thread track at an adjacent beginning or end of the thread track is greater than 90° in a central portion between the first and the second end of the ball race. To determine the angle, a side of the tangent on which a portion of the thread track directly adjacent to the beginning or the end lies is selected. To produce the ball screw spindle, a channel of the ball return is introduced into the circumferential wall, a thread is introduced into an outer circumferential surface of the ball screw spindle, and in each case one depression is introduced into the outer circumferential surface at the beginning and at the end of the thread track, and inserts are inserted into the depressions.

10 Claims, 4 Drawing Sheets

(51) Int. Cl.
*F16H 25/22* (2006.01)
*F16D 125/40* (2012.01)

(56) References Cited

U.S. PATENT DOCUMENTS

| | | | |
|---|---|---|---|
| 2003/0051569 A1* | 3/2003 | Kapaan | F16D 65/18 74/424.82 |
| 2015/0369349 A1* | 12/2015 | Kuo | F16H 25/2228 74/424.85 |
| 2017/0023080 A1* | 1/2017 | Gerber | F16D 55/224 |

* cited by examiner

BALL SCREW DRIVE, METHOD FOR PRODUCING A BALL SCREW DRIVE AND ACTUATOR ASSEMBLY HAVING A BALL SCREW DRIVE

CROSS-REFERENCE TO RELATED APPLICATION

This application claims priority to German Priority Application No. 102022134386.3, filed Dec. 21, 2022, the disclosure of which is incorporated herein by reference in its entirety.

TECHNICAL FIELD

The disclosure relates to a ball screw drive, for example for an actuator assembly of an electromechanically actuated vehicle brake. The disclosure also relates to a method for producing a ball screw spindle of a ball screw drive and to an actuator assembly having a ball screw drive.

BACKGROUND

Ball screw drives comprise a ball screw spindle and a spindle nut, wherein a multiplicity of balls is accommodated in a thread track between the ball screw spindle and the spindle nut. Owing to the rotation of the ball screw spindle or the spindle nut, the balls are transported to one of the ends of the thread track. From there, they are returned to the other end of the thread track via a ball return. The ball return connects the beginning and end of the thread track, and therefore the balls pass through a closed curve in an endless loop.

In ball screw drives with a spindle nut open on both sides, it is known to arrange the ball return in the spindle nut. By gradually inserting a cylindrical rod into the spindle nut, the balls can be installed in the thread grooves of the latter and in the ball return. The balls are secured in the spindle nut against falling out by the cylindrical rod. The ball screw spindle is then screwed into one end of the spindle nut and, in the process, the cylindrical rod is pushed out of the nut at the other end.

However, if, for example, a spindle nut closed on one side is to be used, assembly in the manner described above is not possible since the rod serving as an assembly aid cannot be pushed out by inserting the ball screw spindle into the spindle nut. In conventional ball screw drives, pre-installation of the balls on the ball screw spindle is also not possible since in this case a ball return in the spindle nut cannot be filled with balls.

In addition, a ball return on the spindle nut often increases the installation space required.

SUMMARY

Accordingly, there is a need to provide an improved ball screw drive which enables the use of a spindle nut closed on one side. In addition, the aim is to simplify a method for producing a ball screw spindle.

A ball screw drive having a ball screw spindle rotatably mounted about a spindle axis, on which a spindle nut is received, wherein a thread track is formed on the outer circumferential surface of the ball screw spindle, which track extends over more than 360° and in which a multiplicity of balls is guided in such a way that a rotation of the ball screw spindle causes an axial movement of the spindle nut along the spindle axis. A circumferential wall of the ball screw spindle has a portion of a ball return for the balls, which connects a beginning and an end of the thread track to one another. A respective depression is formed in the circumferential wall at the beginning and at the end of the thread track, into which depression a separate insert is inserted in each case, wherein a ball race is formed in each insert, which race runs between a first and a second end and which is part of the ball return. The inserts are arranged in such a way that in each case one of the ends of the ball race adjoins the portion of the ball return and the respective other end adjoins the beginning of the thread track or the end of the thread track, wherein, in a section perpendicular to the spindle axis, an angle of the ball race to a tangent to the thread track at the adjacent beginning or end of the thread track is greater than 90° in a central portion between the first and the second end of the ball race, and wherein, to determine the angle, that side of the tangent on which a portion of the thread track directly adjacent to the beginning or the end lies is selected.

Since the ball race can run entirely in the insert between the beginning or end of the thread track and the portion of the ball return on the circumferential wall, the shape of the depression must only be designed for the outer contour of the insert, but not for the shape of the ball race. This offers an advantage that the depression can be formed with a simple geometric inner contour, and the insert can be formed with a correspondingly simple geometric outer contour. Complex machining of the ball screw spindle can thus be avoided, making production easier and reducing costs. The insert can be manufactured as a separate component. It is therefore still possible, with little effort, to implement within the insert even a complex geometric shape of the ball race, with which the balls can be guided along the entire ball race and, if necessary, deflected in several spatial directions.

The obtuse angle between the thread track and the central portion of the ball race ensures gentle deflection of the balls from the thread track into the ball return and from this back into the thread track. In this way, the friction of the balls in the ball return is reduced, and the development of noise is also reduced.

The spindle nut has on its inside, a thread corresponding to the thread track of the ball screw spindle, the said thread having a single, continuous thread groove.

The ball return connects the beginning and end of the thread track to form a closed curve through which the balls pass.

When, during a rotation of the ball screw spindle, a ball has arrived at the end of the thread track, the ball is pushed by the following balls into the ball race of the insert during further rotation of the ball screw spindle, is transported further out of the insert into the portion of the ball return on the circumferential wall and finally transported into the second insert and from there back to the beginning of the thread track. Whether the balls pass through the ball return from the end of the thread track to its beginning or vice versa depends, of course, on the direction of rotation of the ball screw spindle. For reasons of clarity, only one direction of rotation is considered here in each case.

In one exemplary arrangement, exactly one single thread track is provided on the ball screw spindle.

The portion of the ball return is formed by a channel within the circumferential wall of the ball screw spindle. In this way, optimum use can be made of the limited installation space in the ball screw drive.

The channel is formed by an axial bore which runs parallel to the spindle axis. This simplifies manufacture. The channel should intersect the depressions to allow a connection to the ball races of the inserts in a simple manner. The channel can have a circular cross-section that corresponds to the diameter of the balls, taking into account manufacturing tolerances.

For reasons of weight saving, the ball screw spindle can be designed as a hollow cylinder in the region of the thread track.

The depression for receiving the insert is preferably of elongate design, and an outer contour of the insert is matched precisely to an inner contour of the depression. The non-circular shape provides protection against incorrect installation of the insert.

A suitable shape is, for example, an oval with parallel longitudinal side surfaces. Other shapes, for example with a symmetry with respect to a 180° rotation, are also suitable.

A vertical direction of the depression and thus also of the insert, which runs perpendicularly to the longitudinal direction, can be arranged perpendicularly to the spindle axis.

In one exemplary variant, the longitudinal direction of the depression is aligned at the pitch angle of the thread track with respect to the spindle axis, wherein the longitudinal direction of the depression extends as a continuation of the thread track at the beginning and at the end of the thread track.

The first and second ends of the ball race of the insert can be formed in different side surfaces of the insert, for example in side surfaces offset from one another by 90°. In particular, it is possible to form the connection of the ball race to the thread track in a narrow side surface of the insert, and the connection of the ball race to the channel of the ball return in one of the longitudinal side surfaces. In this way, the entire volume of the insert can be used to deflect and guide the balls through the ball race. This leads to a reduction in frictional forces and less noise.

The ball race may, for example, extend in a curved manner from the first end to the central portion and/or from the central portion to the second end, such that the transition of the ball race to the thread track has an angle of 180°. When entering and leaving the ball race, the balls are in this case deflected only within the insert, making it possible to achieve large radii of curvature and thus low-friction guidance.

It has been found that a curved region where the balls are introduced into and/or discharged from the ball return reduces the friction in the ball return and thus increases the efficiency of the ball screw drive.

The curvature can also be used to compensate for the angle at which the insert is tilted with respect to the spindle axis, in order to adjust the alignment of the depression to the pitch of the thread track when the balls pass from the insert into the channel of the ball return or from this back into the other insert. It may therefore be advantageous to provide at least the transition from the central portion of the ball race to the second end of the ball race, that facing the channel, with a curvature.

For example, the central portion runs in a straight line.

It is also possible to design the ball race with an S-shaped profile in a radial plane. A radial plane is understood here to mean a section plane parallel to a radial direction of the ball screw spindle.

The two ends of the ball race of an insert can be arranged offset in the longitudinal and/or vertical direction of the insert. In this way, the volume of the insert can be better utilized for the arrangement of the ball race.

A deflection portion can be provided at the first end of the ball race of the insert, projecting outwards from the thread track. This deflection portion helps to introduce the balls into the insert at the end of the thread track or to introduce the balls back into the thread track from the insert at the beginning of the thread track. The deflection portion can be inclined with respect to the radial direction towards the outer circumferential surface of the ball screw spindle in order to allow better deflection.

In one exemplary arrangement, the insert is an injection-moulded component, a die-cast component or a sintered component. It can be constructed of plastic, metal or ceramic. In all cases, the insert may be a solid component in which the ball race is formed as closed tube that is continuous from the first end to the second end. In this case, the tube can follow any suitably curved course in all spatial directions.

The ball race may be already formed at the same time during the production of the insert by the moulding tool used.

When a plastic is used, the material of the insert also contributes to noise damping.

In one exemplary arrangement, both inserts are of identical shape and the inserts are arranged in such a way that in each case the second end of the ball race adjoins the portion of the ball return and in each case the first end adjoins the beginning of the thread track or the end of the thread track. In order to achieve this, the inserts are configured in such a way that they can be arranged at the beginning and at the end of the thread track, rotated by 180° with respect to one another. Only one type of insert then needs to be manufactured, reducing costs. The two depressions can also have the same geometric shape.

A method for producing a ball screw spindle of a ball screw drive of the kind described above is also disclosed. The following steps are provided:
  introducing a portion of a ball return in a form of a channel into a circumferential wall of the ball screw spindle,
  introducing a thread into an outer circumferential surface of the ball screw spindle,
  introducing in each case one depression into the outer circumferential surface at a beginning and at an end of a thread track which intersects the channel, and
  inserting an insert with a ball race into each of the depressions, such that the ball race of one of the inserts adjoins the beginning and the ball race of the other insert adjoins the end of the thread track.

The thread track is defined by the points of the thread at which the depressions are introduced into the outer circumferential surface. The thread can be produced on the entire outer circumferential surface to simplify manufacture.

The thread can be produced by rolling, for example.

In one exemplary arrangement, the two inserts are inserted into the respective depressions in such a way as to be rotated by 180° with respect to one another.

The inserts are fixed firmly in the respective depression in a suitable manner, for example by nonpositive engagement, positive engagement and/or an adhesive connection.

The introduction of the thread, the channel and the depressions can take place in any suitable sequence.

In one exemplary arrangement, the channel is a bore in a direction parallel to the spindle axis.

The depression can, for example, be introduced into the outer circumferential surface simply by a cutting tool guided in a radial direction of the ball screw spindle and perpendicularly thereto.

An inner contour of the depression can extend in the vertical direction of the insert, for example parallel to the radial direction of the ball screw spindle.

A longitudinal direction of the depression may be aligned perpendicularly to the spindle axis and as an extension of the thread track.

In this case, each depression should intersect the channel.

In this way, a ball return with a geometrically complex ball race can be produced at the beginning and at the end of the thread track, and in this case only manufacturing steps that are easy to carry out have to be carried out on the ball screw spindle.

An actuator assembly having a ball screw drive of the kind described above is also disclosed, wherein the spindle nut is of closed design on one side. Since the ball return is implemented exclusively in the ball screw spindle, a simple installation of the balls in the thread track and the ball return is easily possible even with a spindle nut closed on one side.

Moreover, the ball return integrated into the ball screw spindle allows a compact design of the ball screw drive.

However, the ball screw drive can also be implemented with a spindle nut that is open on both sides.

In a one exemplary application, the actuator assembly is part of a vehicle brake, wherein the spindle nut forms a brake piston. That is to say that the spindle nut is used to apply a friction pad to a brake rotor of the vehicle brake.

BRIEF DESCRIPTION OF DRAWINGS

The disclosure will be described hereinafter in greater detail on the basis of an exemplary arrangement with reference to the accompanying figures. In the figures.

For reasons of clarity, all identical components are not always provided with reference signs.

DETAILED DESCRIPTION

Figure 1:
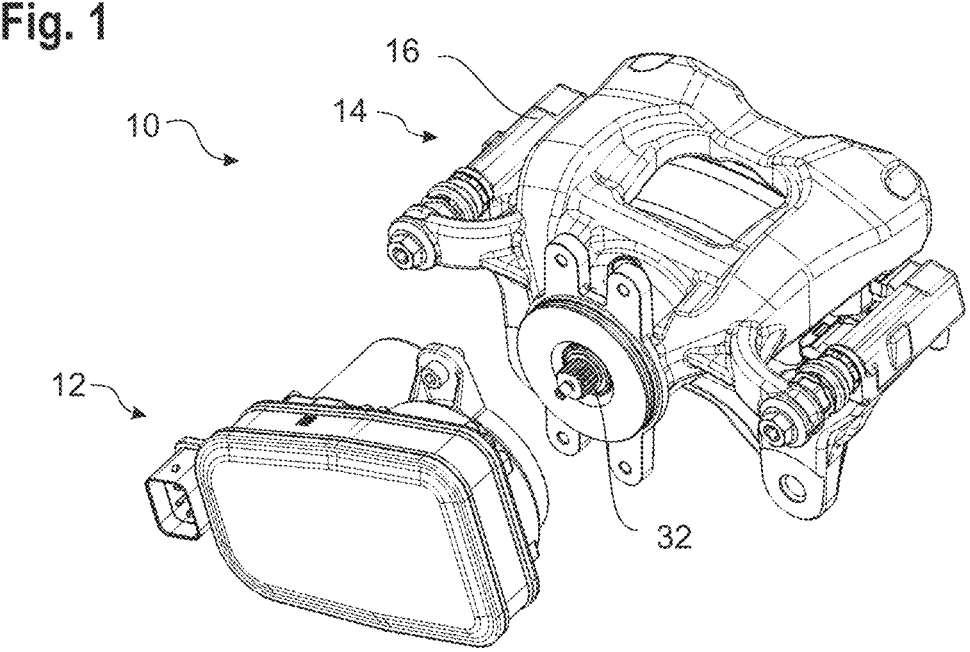
FIG. 1 shows a schematic perspective illustration of an actuator assembly of a vehicle brake according to the disclosure.
Figure 2:
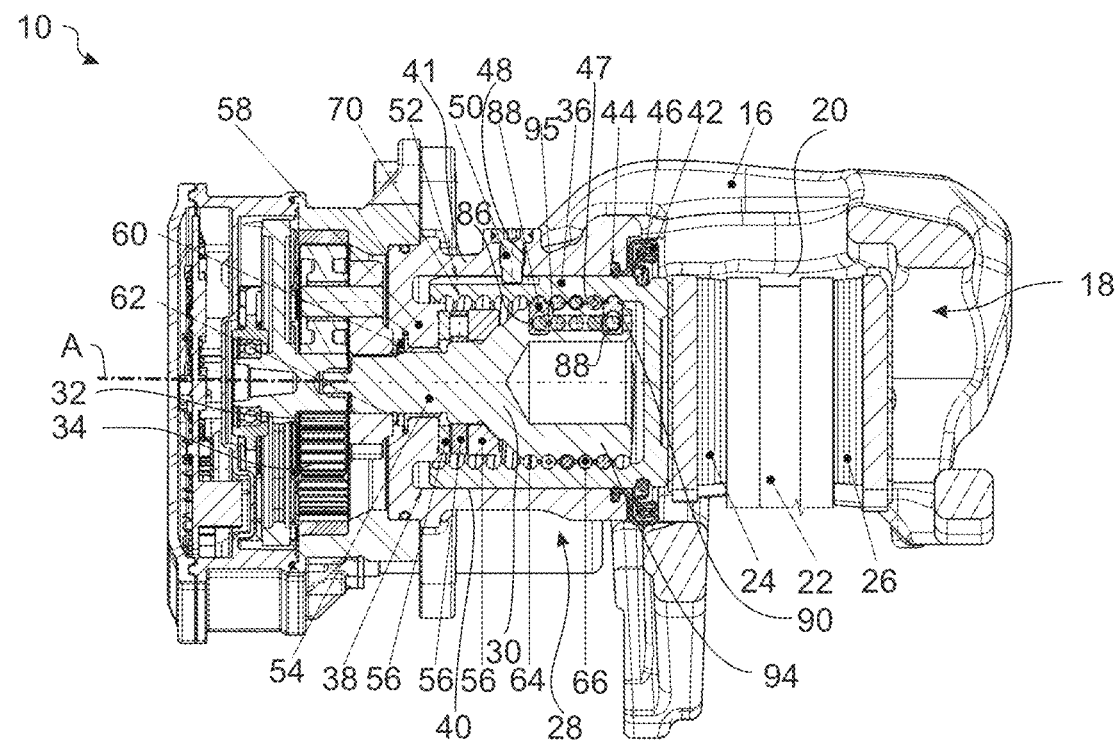
FIG. 2 shows a schematic sectional view of the actuator assembly from FIG. 1.

FIGS. 1 and 2 show an actuator assembly 10 for a vehicle brake.

The actuator assembly 10 comprises a control assembly 12, which can be installed as a separate sub-unit, and a drive and brake assembly 14, which can be installed as a separate sub-unit. The drive and brake assembly 14 is accommodated in a common housing 16.

A housing of the control assembly 12 is connected to the housing 16. Here, both housings are produced from a plastic material.

The drive and brake assembly 14 includes a brake caliper 18, in which a space 20 for a brake rotor 22, i.e. a brake disc, is formed. The brake rotor 22 interacts with two friction pads 24, 26, which can be pressed against the brake rotor 22 to produce a braking effect.

The pressing force for closing the brake is produced by a ball screw drive 28.

The ball screw drive 28 described can, of course, also be used in other areas of application in which ball screw drives are conventionally used.

The ball screw drive 28 comprises a ball screw spindle 30 rotatably mounted about a spindle axis A (see also FIGS. 3 to 9).

In this case, the ball screw spindle 30 is connected via a toothed portion 32 to a transmission thread 34 (not illustrated specifically) and, via the latter, to an electric motor (not illustrated). Thus, the ball screw spindle 30 can be driven by means of the electric motor and moved in both directions of rotation.

A spindle nut 36 closed axially on one side, which is designed, for example, as a piston-shaped brake piston, is mounted on the ball screw spindle 30.

A rotation of the ball screw spindle 30 causes an axial movement of the spindle nut 36 along the screw axis A.

In this case, the spindle nut 36 is guided along the spindle axis A directly on a running surface 38.

The spindle nut 36 is used to apply the friction pads 24, 26 to the brake rotor 22. To be more precise, the friction pad 24 can be actively moved towards the brake rotor 22 by the actuator assembly 10. Here, the friction pad 24 is contacted directly by an end face of the spindle nut 36.

It is clear that the spindle nut 36 can be moved in the same way, by operating the electric motor in the opposite direction of rotation, into a retracted position which is assigned to lifting the brake pads 24, 26 from the brake rotor 22.

In the present case, the actuator assembly 10 is embodied without self-locking and therefore, because of system-inherent elasticities, the spindle nut 36 also automatically moves back into the retracted position when no longer actively loaded into the extended position by means of the electric motor.

The running surface 38 defines a substantially cylindrical receiving space 40 for the ball screw drive 28 in a brake housing cylinder 41. A seal 42, here made of an elastomer, is provided at the transition from the space 20 to the receiving space 40.

The seal 42 is formed as a bellows and held both on the brake caliper 18 and on the spindle nut 36, with the result that the seal 42 is expanded or compressed when the spindle nut 36 moves. For this purpose, ends of the seal 42 which are thickened in the form of beads are engaged in grooves 44, 46 in the brake caliper 18 and in an outer circumferential surface 47 of the spindle nut 36.

Furthermore, an aperture 48 is provided in the brake caliper 18 in the region of the running surface 38. A rotational locking element 50 is inserted in the aperture 48 and protrudes through the aperture 48 to engage in an axially running groove 52 on the outer circumferential surface 47 of the spindle nut 36.

In the exemplary arrangement, the rotational locking element 50 is a screw which is screwed into a threaded bore forming the aperture 48.

The reaction force of the axial force or brake application force produced by the ball screw drive 28 is transmitted by a spindle shaft 54 via axial rolling bearing elements 56 and is supported on the housing.

Here, the axial rolling bearing elements 56 consist of a planar axial bearing ring disc, an axial rolling bearing and a bearing ring. The axial rolling bearing is optionally embodied as an axial cylindrical roller bearing or as a single-row or multi-row axial needle bearing and is centred on the spindle shaft 54. The bearing ring has a planar contact surface on one side and a concave contact surface on the opposite side. With its concave contact surface, the bearing ring is in engagement with a convex contact geometry applied to the spindle shaft 54. The rolling elements of the axial rolling bearing roll on the planar contact surfaces of the axial ring disc and the bearing ring.

In the initial position of the spindle nut 36, i.e. when the friction pads 24, 26 have a full pad thickness and the brake rotor 22 has a full disc thickness, the axial rolling bearing elements 56 are positioned centrally within the spindle nut 36 in the axial direction. For this purpose, a bottom of the brake housing cylinder 41 is embodied as a raised plateau 58.

Here, the spindle shaft 54 is supported radially at the free end in the brake housing cylinder 41 with the aid of the radial plain bearing 60. The radial plain bearing 60 is pressed into the wall of the bottom of the brake housing cylinder 41 from the outside. A collar of the radial plain bearing 60 contacts the bottom of the brake housing cylinder 41. Axial forces that act on the spindle shaft 54 during the reduction of the brake application force and the retraction of the spindle nut 36 are supported on the collar of the radial plain bearing 60. For this purpose, a retaining ring 62 is snapped into a groove in the spindle shaft 54. As a result, the retaining ring 62 is able to transmit axial forces of the spindle shaft 54.

In this example, the ball screw spindle 30 is hollowed out at its end directed towards the caliper 18 for weight-reducing reasons.

The ball screw drive 28 is described in more detail below in conjunction with FIGS. 3 to 9.

A continuous thread 70 with an identical pitch to that of the thread track 64 is formed on an inner circumferential surface of the spindle nut 36.

The balls 66 are accommodated between the thread track 64 on the ball screw spindle 30 and the thread 70 on the spindle nut 36. A rotation of the ball screw spindle 28 causes an axial movement of the spindle nut 36 along the spindle axis A, which coincides with the axis of rotation of the ball screw spindle 28. Here, the direction of rotation of the ball screw spindle 30 determines the direction of movement of the balls 66 in the thread track 64 and also the direction of movement of the spindle nut 36.

The osculation factor, i.e. the ratio of a radius of the thread track 64 to the diameter of the balls 66, is between 0.52 and 0.55 here.

Figure 3:
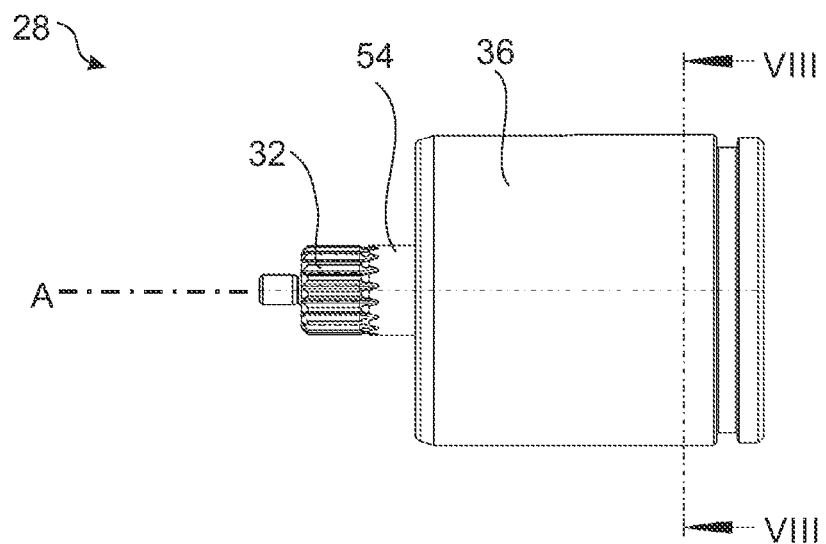
FIG. 3 shows a schematic perspective illustration of a ball screw drive according to the disclosure, produced by a method according to the disclosure.

FIG. 3 shows the ball screw drive 28 as a separate component.

Figure 4:
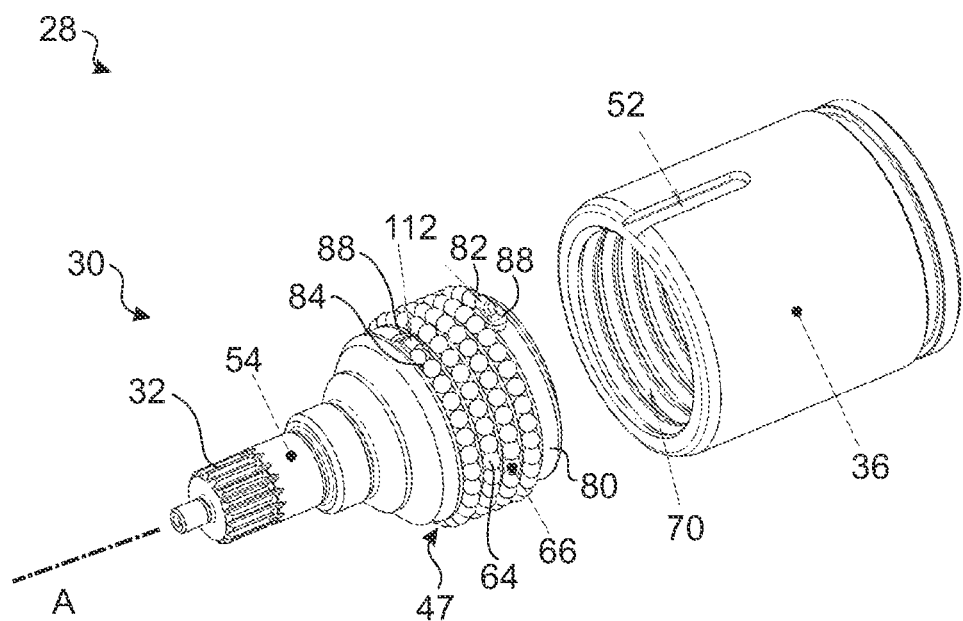
FIG. 4 shows the ball screw drive from FIG. 3 with the ball screw spindle and spindle nut separated from each other.
Figure 5:
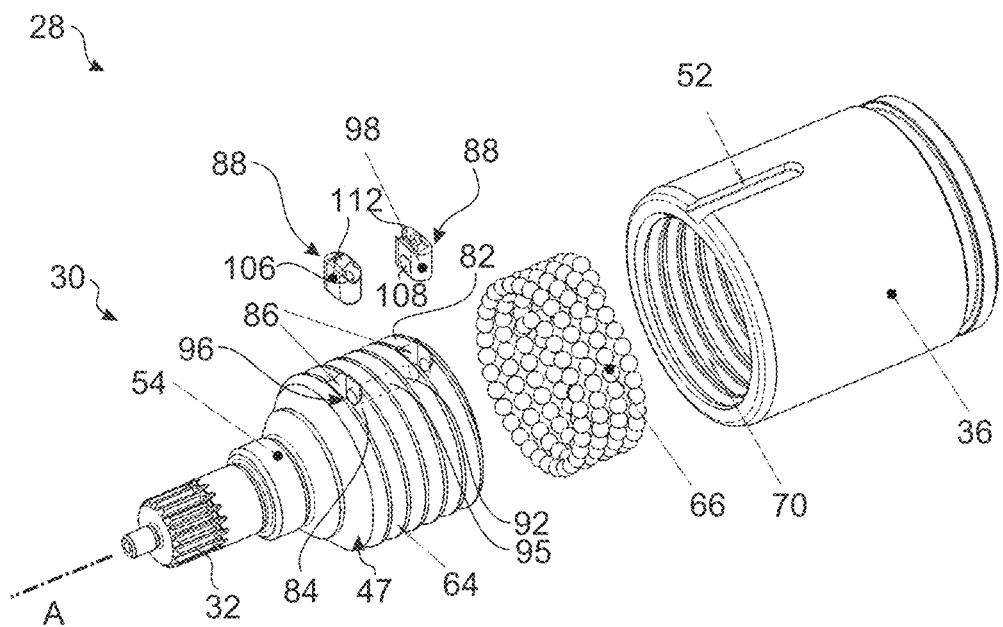
FIG. 5 shows the ball screw drive from FIG. 3 in an exploded view.

FIG. 4 shows the ball screw spindle 30 and the spindle nut 36 of the ball screw drive 28 separately from one another, while FIG. 5 shows an exploded view of the ball screw drive 28.

FIG. 5 clearly shows that a continuous thread 80 is introduced on the outer circumferential surface 47 of the ball screw spindle 30. A portion of the thread 80 that extends over a plurality of complete revolutions around the spindle axis A forms the thread track 64. The balls 66 are arranged in a sequential series on the thread track 64.

Here, the threads 70, 80 are designed as a circular arc or as a gothic ogival arc in profile section.

A beginning 82 and an end 84 of the thread track 64 are each defined by a depression 86, which are introduced into the outer circumferential surface 47 substantially along the radial direction r. The beginning 82 and end 84 of the thread track 64 are, of course, dependent on the direction of rotation of the ball screw spindle 30 and therefore swap over when the direction of rotation changes.

Figure 7:
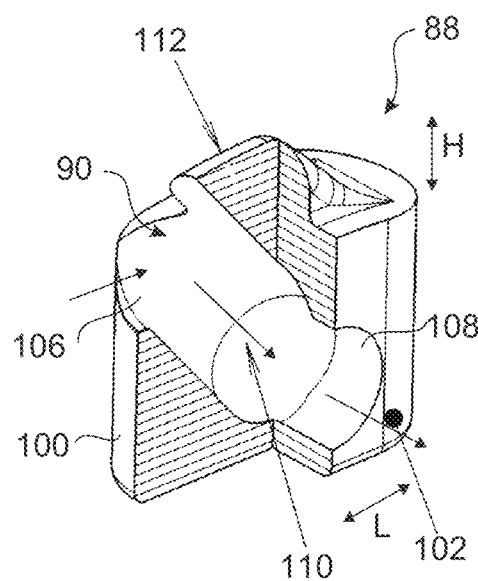
FIG. 7 shows a schematic partially sectioned view of the insert from FIG. 6.

An insert 88, in which a ball race 90 is formed, is inserted into each of the depressions 86 (see also, for example, FIG. 7). The insert 88 is firmly fixed in the respective depression 86, for example by means of positive engagement, nonpositive engagement and/or an adhesive connection.

The depressions 86 both intersect a channel 92 that extends parallel to the spindle axis A through a circumferential wall 94 of the ball screw spindle 30.

The channel 92 forms a portion 95 of a ball return 96, which also comprises the ball races 90 in the inserts 88. The balls 66 are returned from the end 84 of the thread track 64 to the beginning 82 of the thread track 64 via the ball return 96. Together with the ball return 96, the thread track 64 forms a closed curve, along which the balls 66 are guided in an endless loop. Adjacent balls 66 are in contact over this entire curve. Balls 66 that enter the ball return 96 from the thread track 64 push the balls 66 that are already in the ball return 96 through the latter, ensuring that the balls 66 are returned to the beginning 82 of the thread track 64. Upon entry of a ball 66 into the ball return 96, the ball 66 is removed from the flow of force and returns to the flow of force upon exit from the ball return 96.

In this example, exactly one thread track 64 is present.

Figure 6:
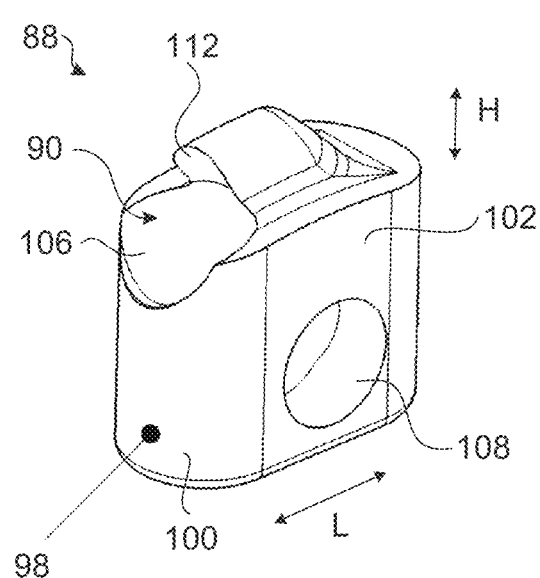
FIG. 6 shows a schematic perspective illustration of an insert of the ball screw drive from FIG. 3.

FIGS. 6 and 7 show the insert 88 in more detail.

In the example shown here, only a single type of insert 88 is used. The insert 88 is designed in such a way that it can be inserted into the depressions 86 in two different orientations.

The insert 88 has a geometrically simple outer contour 98, here an oval with four side surfaces, namely two narrow sides 100, which are connected to one another by two parallel longitudinal side surfaces 102. The longitudinal side surfaces 102 define a longitudinal direction L of the insert 88, along which the insert 88 is longer than along the narrow sides 100. The outer contour 98 is symmetrical with respect to a rotation by 180° about a vertical direction H of the insert 88.

The outer contour 98 of the insert 88 is matched precisely to an inner contour 104 of the depression 86. Insertion into the depression 86 therefore precisely and unambiguously defines the position of the insert 88 with respect to the ball screw spindle 30.

Owing to the elongate shape of the insert 88, installation of the insert 88 is only possible in exactly two orientations, between which the insert is rotated by 180° about its vertical direction.

The two inserts 88 are inserted into their respective depressions 86 in such a way as to be rotated by 180° with respect to one another.

As regards the two possible orientations, the insert 88 is asymmetrical here with respect to the course of the ball race 90.

The insert 88 is inserted into the respective depression 86 in such a way that a first end 106 of the ball race 90 adjoins the beginning 82 or the end 84 of the thread track 64. A second end 108 of the ball race 90 adjoins the channel 92 in each case.

Figure 8:
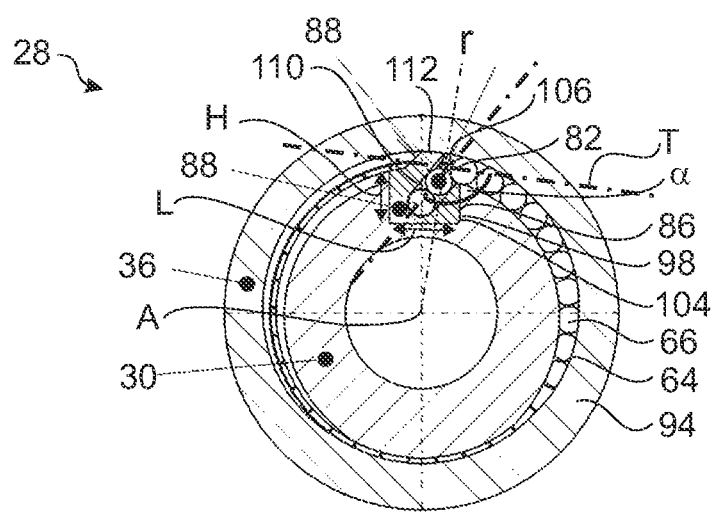
FIG. 8 shows a schematic sectional view through the ball screw drive from FIG. 3 along the line VIII-VIII in FIG. 3.
Figure 9:
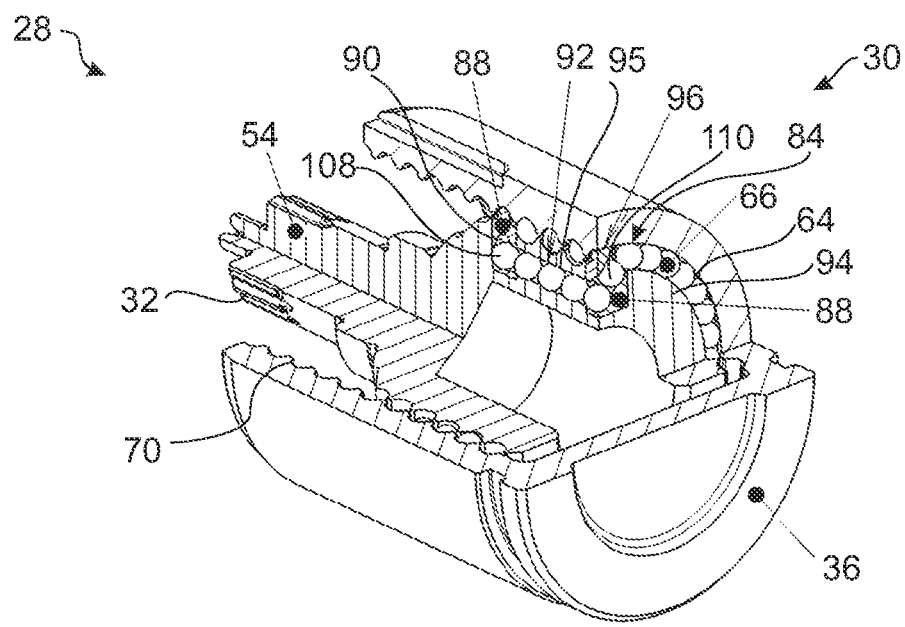
FIG. 9 shows a schematic partially sectioned view of the ball screw drive from FIG. 3.

At the first end 106 and at the second end 108, the ball race 90 runs in a curved manner here, while it runs in a straight line in a central portion 110 in this example (see also FIGS. 8 and 9).

The ball race 90 is shaped in such a way that the beginning 82 and end 84 of the thread track 64 open into the ball race 90 of the respective insert 88 continuously and at a 180° angle at the first end 106.

That region of the ball race 90 which is situated between the first end 106 and the central portion 110 is curved in such a way that the ball race 90 merges into the central portion 110 continuously and with the largest possible radius.

Here, the central portion 110 extends obliquely both with respect to the longitudinal direction L and with respect to the vertical direction H of the insert 88.

This has the effect that, in a section perpendicular to the spindle axis A, an angle a of the ball race 90 to a tangent T applied to the thread track 64 at the adjacent beginning 82 or end 84 of the thread track 64 is greater than 90° in the central portion 110 of the ball race 90 (to determine the angle, that side of the tangent on which a portion of the thread track 64 directly adjacent to the beginning 106 or the end 108 lies is selected in each case). This is also clearly evident in FIGS. 8 and 9. FIG. 8 shows a corresponding tangent T and a centre line M along the central portion 110 for illustration purposes.

Here, the central portion 110 runs at an angle of approximately 45° with respect to the vertical direction H and with respect to the longitudinal direction L in a sectional view perpendicular to the spindle axis A (see, for example, FIG. 8). Thus, between a tangent T to the thread track 64 at its beginning 82 or end 84 and the course of the central portion 110, the angle a is greater than 90°, here approximately 135°.

The first end 106 of the ball race 90 is arranged at an upper end, with respect to the vertical direction H, of the insert 88 in the narrow side 100. The second end 108 of the ball race 90, on the other hand, is situated at a lower end of one of the longitudinal side surfaces 102.

The ball race 90 is designed as a circumferentially closed, three-dimensionally curved tube through the interior of the insert 88 (see also FIGS. 7 to 9). The cross-section of the tube is circular here and matched to the diameter of the balls 66 within the scope of the manufacturing tolerances.

The balls 66 are deflected between the first and second ends 106, 108 both with respect to the longitudinal direction L and with respect to the vertical direction H.

In addition, the balls 66 entering the ball race 90 at the first end 106 are deflected laterally by about 90° before they exit at the second end 108.

As can be seen in FIG. 7, in a section parallel to the longitudinal direction L and along the vertical direction H, the ball race 90 here runs in an S shape between the two ends 106, 108. In the state inserted into the ball screw spindle 30, this section plane lies in a radial plane parallel to the radial direction r of the ball screw spindle 30.

However, a different course of the ball race 90 would also be conceivable.

The depressions 86 and the inserts 88 inserted therein are positioned in such a way that their longitudinal direction L lies along the thread track 64 at the beginning 82 and end 84 of the thread track 64, i.e. they are inclined at an angle to the spindle axis A that corresponds to the pitch of the thread track 64.

At the second end 108, the course of the ball race 90 compensates for the oblique position of the insert 88 by the pitch of the thread track with respect to the spindle axis A, and therefore the ball race 90 opens into the channel 92 at a 180° angle.

Here, the vertical direction H is aligned parallel to the radial direction r of the ball screw spindle 30.

At the first end 106 of the ball race 90, a deflection portion 112 is formed in the insert 88 and extends away from the outer circumferential surface 47 of the ball screw spindle 30. The deflection portion 112 is inclined towards the thread track 64, and therefore it supports the balls 66 upon entry into the ball race 90 from the thread track 64 and upon exit from the ball race 90 into the thread track 64.

The insert 88 is a solid moulded part, in which the ball race 90 is already completely formed during the manufacturing process.

For example, the insert 88 is produced as an injection-moulded component, as a die-cast component or as a sintered component from a suitable plastic, metal or ceramic material. The manufacture of the insert 88 takes place separately from the production of the ball screw spindle 30.

To produce the ball screw spindle 30, the thread 80 is first introduced into the outer circumferential surface 47. This is accomplished by rolling, for example. The thread 80 can extend over the entire length of the outer circumferential surface 47.

The two depressions 86 are then produced in their desired orientation in the outer circumferential surface 47. The depressions 86 are placed at the desired beginning 82 and end 84 of the thread track 64.

The depressions 86 are produced, for example, by a cutting tool, which is, for example, guided only along the radial direction r and perpendicularly thereto. Here, for example, a milling process is used. The inner contour 104 of the depression 86 extends, for example, along the surfaces corresponding to the longitudinal side surfaces 102 of the insert 88, purely parallel to the radial direction r.

In addition, the channel 92 is introduced into the circumferential wall 94, for example by an axial bore from one end face of the ball screw spindle 30.

Both depressions 86 intersect the channel 92.

The inserts 88 are inserted into the depressions 86, such that the first end 106 of the ball race 90 adjoins the beginning 82 or the end 84 of the thread track 64 and the second end 108 adjoins the channel 92.

The inserts 88 are fixed firmly in the depressions 86. This is accomplished, for example, by nonpositive engagement, positive engagement and/or an adhesive connection.

The invention claimed is:

1. A ball screw drive comprising a ball screw spindle rotatably mounted about a spindle axis, on which a spindle nut is received, wherein a thread track is formed on an outer circumferential surface of the ball screw spindle, which track extends over more than 360° and in which a multiplicity of balls is guided in such a way that a rotation of the ball screw spindle causes an axial movement of the spindle nut along the spindle axis, wherein a circumferential wall of the ball screw spindle has a portion of a ball return for the balls, which return connects a beginning and an of the thread track to one another, and wherein a respective depression is formed in the circumferential wall at the beginning and at the end of the thread track, into which depression a separate insert is inserted in each case, and wherein a ball race is formed in each insert, which race runs between a first and a second end and which is part of the ball return, wherein the portion of the ball return is formed by a channel within the circumferential wall of the ball screw spindle, the channel being formed by an axial bore which runs parallel to the spindle axis and which intersects the depressions, wherein the inserts are arranged in such a way that in each case one of the ends of the ball race adjoins the portion of the ball return and the respective other end adjoins the beginning of the thread track or the end of the thread track, wherein the inserts are arranged in the respective depressions rotated by 180° with respect to one another, wherein the insert has an elongate design with an outer contour matched to an inner contour of the depression, the outer contour comprising two parallel longitudinal side surfaces connected by two narrow sides, wherein the first end of the ball race is formed in one of the narrow sides and the second end of the ball race is formed in one of the longitudinal side surfaces, and wherein, in a section perpendicular to the spindle axis, an angle of the ball race to a tangent to the thread track at the adjacent beginning or end of the thread track is greater than 90° in a central portion between the first and the second end of the ball race, wherein, to determine the angle, that side of the tangent on which a portion of the thread track directly adjacent to the beginning or the end lies is selected.

2. A ball screw drive according to claim 1, wherein the first and second ends of the ball race of the insert are formed in different side surfaces.

3. A ball screw drive according to claim 1, wherein the ball race runs in a straight line in the central portion.

4. A ball screw drive according to claim 1, wherein the insert is an injection-moulded component, a die-cast component or a sintered component.

5. A ball screw drive according to claim 1, wherein both inserts are of identical shape and the inserts are arranged in such a way that in each case the second end of the ball race adjoins the portion of the ball return and in each case the first end adjoins the beginning of the thread track or the end of the thread track.

6. An actuator assembly having a ball screw drive a Claim 1.

7. An actuator assembly according to claim 6, wherein the actuator assembly is part of a vehicle brake and the spindle nut forms a brake piston.

8. A ball screw drive according to claim 1, wherein the first and second ends of the ball race of the insert are formed in different side surfaces.

9. A ball screw drive according to claim 8, wherein the ball race extends in a curved manner from the first end to the central portion and/or from the central portion to the second end, such that the transition of the ball race to the thread track has an angle of 180°.

10. A ball screw drive according to claim 9, wherein the ball race runs in a straight line in the central portion.

* * * * *